INVENTOR.
Richard E. Langworthy
BY
AH Oedham
ATTORNEY

United States Patent Office 2,749,036
Patented June 5, 1956

2,749,036

MEANS FOR PREVENTING COMPUTING ERRORS IN A MULTIPLE POTENTIOMETER COMPUTING ELEMENT

Richard E. Langworthy, Cuyahoga Falls, Ohio, assignor to Goodyear Aircraft Corporation, Akron, Ohio, a corporation of Delaware Application October 7, 1950, Serial No. 188,987

7 Claims. (Cl. 235—61)

This invention relates to a means for preventing computing errors caused by resistor loading in multiple potentiometer computing elements.

The use of a multiple potentiometer computing element, that is, two or more potentiometers joined together mechanically to operate in unison from a common drive source, is well known in the analog computing art. The value of the potentiometer lies in the fact that the voltage across one end of the potentiometer and the wiper contact is proportional to the voltage across the potentiometer, the proportionality factor being a function of the mechanical position of the wiper contact along the length of the potentiometer. When two such potentiometers are joined together, the voltage across the wiper contact and the end of one potentiometer is then directly proportional to the voltage across the wiper contact and one end of the second potentiometer, the proportionality factor being a ratio of the two voltages across the ends of the potentiometers.

However, it is to be remembered that this relationship only holds true so long as no current is passing through either potentiometer, that is, both potentiometers must be working into an infinite impedance. As soon as a load is placed across one of the potentiometers, the voltage appearing across the load, that is, across the wiper contact and one end of the potentiometer, is no longer a linear function of the mechanical position of the wiper along the length of the potentiometer. This, in turn, means that the relation between the voltage across the wiper contact and end of one potentiometer is no longer a linear function of the voltage across the wiper arm and one end of the other potentiometer, an error being introduced by the non-linearity of the loaded potentiometers.

Several methods have been resorted to in prior practice in an effort to overcome the non-linear effect produced by the loading of any measuring circuit put across one of the potentiometers. One obvious method is to use a measuring circuit whose input impedance is of such magnitude that its shunting effect is of negligible proportion. In practice, this approach to the solution is difficult and either too inaccurate or too expensive to be useful.

Another method commonly used has been the insertion of a correction voltage further along in the computation to compensate for the error produced by the loading effect on the potentiometer. This method is applicable only when the value of the corrected voltage can be adjusted in the solution as often as it changes. If this voltage is a function of time, this method becomes quite complicated.

Still another method is to add an impedance across the other leg of the potentiometer so that the errors are distributed both positively and negatively. This type of correction, however, does not attempt to eliminate the errors, but merely to limit their maximum values to some allowable figure.

The fourth method which is sometimes employed to overcome the error introduced by this loading effect is to wind the potentiometer non-linearly, so that the impedance between the wiper contact and either end of the potentiometer is not a linear function of the mechanical displacement of the contact arm. This method involves expensive computation and calibration and has been found unsatisfactory for these reasons.

It is the general object of the invention to avoid and overcome the foregoing and other difficulties of and objections to prior art practices by the provision of an inexpensive circuit arrangement which automatically compensates for errors in potential introduced by loading on one potentiometer.

Another object of the invention is the provision of means which can be easily adjusted to provide for any change in the impedance of the load.

The aforesaid objects of the invention, and other objects which will become apparent as the description proceeds, are achieved by providing in a multiple potentiometer computing element means for preventing computing errors which are produced by loading of one potentiometer including an impedance element shunted across the output of the other potentiometers which are proportional to the load impedance, the proportionality factor being the ratio of the input impedance of the load potentiometer measured without the load divided by the shunted potentiometer impedance measured without the output shunt.

For a better understanding of the invention, reference should be had to the accompanying drawings, wherein.

While the invention is described and illustrated in balancing a two-potentiometer element, it is to be understood that the same principles can be extended to balance more than two ganged potentiometers.

Figure 1:
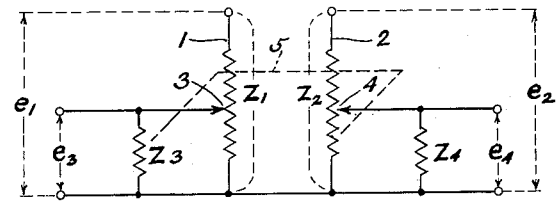
Fig. 1 is a schematic wiring diagram showing the essential features of the invention.

With specific reference to the form of the invention illustrated in Fig. 1, the numeral 1 indicates one potentiometer and the numeral 2, a second potentiometer of a double potentiometer. Wiper contacts 3 and 4, respectively, are mechanically ganged together as indicated schematically by the dash line 5. The end-to-end impedances of potentiometers 1 and 2 are indicated as $Z_1$ and $Z_2$, respectively, with the applied voltages being indicated as $e_1$ and $e_2$. Usually $e_1$ and $e_2$ are not the same value and may vary as a function of time.

The potentials at the wiper contacts 3 and 4 are indicated as $e_3$ and $e_4$ respectively. Assuming the potentiometers are linear, in the absence of the shunt impedances $Z_3$ and $Z_4$, to be described hereinafter, the voltage $e_3$ will be proportional to $e_1$ and $e_4$ to $e_2$, expressed as $$e_3 = Be_1 \text{ and } e_4 = Be_2 \tag{1}$$

where B is the proportionality factor, its value ranging from 0 to 1 depending on the relative mechanical displacement of the wiper contacts along the potentiometers. Because the potentiometers are ganged together, B is the same for both circuits, and therefore the voltages $e_3$ and $e_4$ are in the same ratio as $e_1$ and $e_2$, expressed mathematically $$\frac{e_3}{e_4} = \frac{e_1}{e_2} \tag{2}$$

It is this relation which makes the double potentiometer particularly useful as an analog computing element.

However, the above relation only remains true as long as no current flows producing IR voltage drops in the potentiometers. Thus, when a meter or other measuring means is used to measure, say, the value of $e_4$, the input impedance of the meter, indicated as $Z_4$, loads the potentiometer 2, so that, although $$e_3 = Be_1 \quad (3)$$

the value of $e_4$ is no longer proportional to the mechanical displacement of the wiper contact of potentiometer 2. This is best understood by deriving the relationship of $e_4$ to $e_2$ as a function of displacement of the wiper contact of potentiometer 2 with a load $Z_4$ across one branch of the potentiometer. In any voltage divider, the voltages are proportional to the impedances across which the voltages are taken. Thus $$\frac{e_4}{e_2} = \frac{\dfrac{BZ_2Z_4}{BZ_2+Z_4}}{\dfrac{BZ_2Z_4}{BZ_2+Z_4}+Z_2(1-B)} \quad (4)$$

where $$\frac{BZ_2Z_4}{BZ_2+Z_4}$$

is the impedance of the branch of the potentiometer shunted by $Z_4$ and $Z_2(1-B)$ is the impedance of the other branch of the potentiometer. By the process of algebra Equation 4 reduces to the more easily recognized and usable form of $$e_4 = Be_2 \frac{1}{B(1-B)\dfrac{Z_2}{Z_4}+1} \quad (5)$$

Examination of Equation 5 shows that $e_4$ is no longer linearly related to the mechanical displacement of the wiper contact of potentiometer.

If an impedance $Z_3$ is placed across the potentiometer, as shown in Fig. 1, then in the same manner $$e_3 = Be_1 \frac{1}{B(1-B)\dfrac{Z_1}{Z_3}+1} \quad (6)$$

and Equation 2, with the loads $Z_3$ and $Z_4$ shunting the wiper contacts of the potentiometers, now becomes $$\frac{e_3}{e_4} = \frac{Be_1 \dfrac{1}{B(1-B)\dfrac{Z_1}{Z_3}+1}}{Be_2 \dfrac{1}{B(1-B)\dfrac{Z_2}{Z_4}+1}} \quad (7)$$

It will be evident from this expression that to maintain the linear relationship between $e_3$ and $e_4$, it is only necessary that $$\frac{Z_1}{Z_3} = \frac{Z_2}{Z_4} \quad (8)$$

Thus, although $e_3$ and $e_4$ are no longer linearly proportional to the mechanical displacement of the wiper contacts 3 and 4 along the length of the potentiometers 1 and 2, still they are linearly proportional to each other. Loading of one potentiometer can be compensated by loading of the other potentiometer in amount determined by Equation 8.

Figure 2:
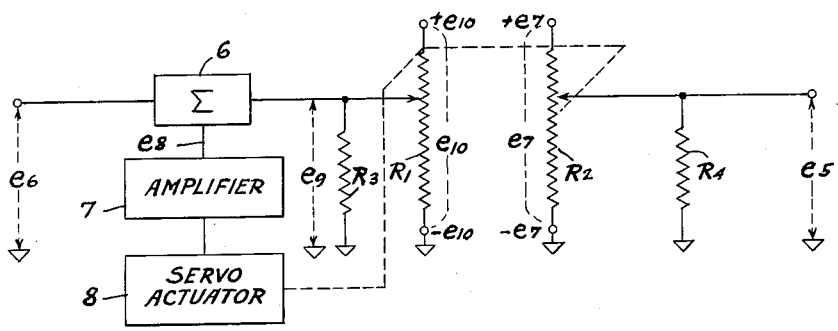
Fig. 2 is a wiring diagram in which one use of the invention is illustrated in a computing element for finding the product of two voltages.
Figure 3:
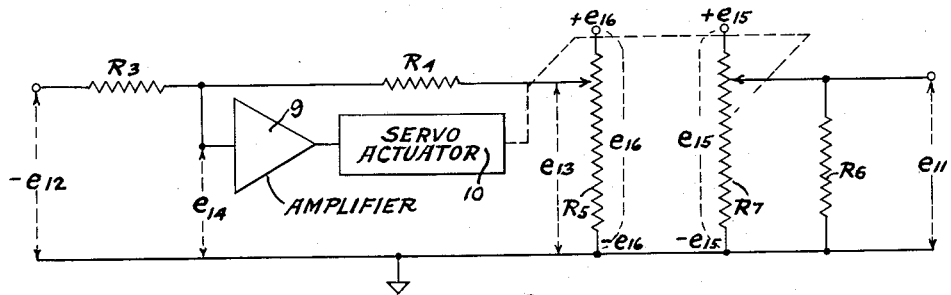
Fig. 3 is a schematic wiring diagram of another computing circuit used to obtain the ratio of two variable voltages which incorporates the invention.

To better illustrate the use and value of the invention, two examples are given in Figures 2 and 3 of computing circuit configurations employing the principles of the invention. Figure 2 illustrates a circuit used where it is desired to obtain a voltage $e_5$ proportional to the product of two signal voltage $e_6$ and $e_7$, the voltage $e_7$ being applied across a potentiometer $R_2$. The box 6 labeled $\Sigma$ measures the difference $e_8$, or error voltage, between the input signal $e_6$ and the voltage $e_9$ resulting from a voltage $e_{10}$ applied across the potentiometer $R_1$. This error voltage or signal is amplified at 7 and through a servo actuator 8 moves the arm of potentiometer $R_1$ to change $e_9$ in such a manner as to reduce the error $e_8$ to zero, making $e_9$ equal to $e_6$. With no loading on either potentiometer, in accordance with Equation 2, the relation $$\frac{e_9}{e_{10}} = \frac{e_5}{e_7} \quad (9)$$

exists. Since the servo system maintains $e_6 = e_9$, the value of $e_5$ may be expressed as $$e_5 = e_6 \cdot e_7 \left(\frac{1}{e_{10}}\right) \quad (10)$$

Thus $e_5$ is proportional to the product of $e_6$ and $e_7$.

However, if a circuit for measuring $e_5$, e. g., a D. C. amplifier or meter having an input resistance $R_4$, is connected across the output of $R_2$, then current is drawn through $R_2$ and the relationship of Equation 10 no longer holds true because $e_5$ is no longer linearly related to $e_9$.

In accordance with the principles of the invention as pointed out in the derivation of Equation 8, a resistor $R_3$ having a value expressed by the equation $$R_3 = \frac{R_1}{R_2} \cdot R_4 \quad (11)$$

is connected across the corresponding leg of the potentiometer $R_1$. Then regardless of the loading of $R_4$, the compensation of $R_3$ restores the relationship expressed by Equation 10.

Considering Fig. 3 in detail, again a pair of ganged potentiometers $R_5$ and $R_7$ are employed. Assuming there is no loading, in conformance with Equation 2

$$e_{11} = \frac{e_{15}}{e_{16}} \cdot e_{13} \quad (12)$$

A pair of resistors $R_3$ and $R_4$ are connected in series with the wiper contact of the potentiometer $R_5$. A high gain D. C. amplifier 9 is connected to the common junction of $R_3$ and $R_4$ and drives a servo actuator 10 which mechanically drives the ganged potentiometers. Whenever the input $e_{14}$ to the amplifier 9 is other than zero, the servo actuator 10 adjusts the position of the wiper contact of the potentiometer to restore $e_{14}$ to zero. When $e_{14}$ is zero, it is evident that $e_{13}$ is related to the input signal $-e_{12}$ by the equation $$e_{13} = -e_{12}\left(\frac{R_4}{R_3}\right) \quad (13)$$

However, $R_4$ is effectively a shunt across the one leg of the potentiometer $R_5$. This loading effect of $R_4$ on potentiometer $R_5$ destroys the relationship of Equation 12. As particularly pointed out in the derivation of Equation 8, addition of a resistor $R_6$ having a value expressed by the Equation $$R_6 = \frac{R_7 R_4}{R_5} \quad (14)$$

restores the relationship of Equation 12. Thus by substitution of the expression of $e_{13}$ in Equation 13 into Equation 12, the expression is derived:

$$e_{11} = \frac{-e_{12}}{e_{16}} \cdot \frac{e_{15} R_4}{R_3}$$

which is the desired relationship, $e_{11}$ being proportional to quotient of $-e_{12}$ and $e_{16}$.

It will be appreciated in the foregoing examples that the potentiometers need not be linear. All that is required for perfect computing accuracy is that the resistances of the potentiometers when ganged together, as measured at the wiper contacts, change at a proportional rate, that is, $$\frac{BR_1}{R_1} = \frac{BR_2}{R_2} \quad (15)$$

for all values of B from 1 to 0. This relationship holds true, of course, for any number of potentiometers that are mechanically ganged together.

From the above description, it will be recognized that the objects of the invention have been achieved by an effective but simple means of compensating for errors introduced by loading the potentiometers. The invention insures absolute accuracy despite loading effects, without the necessity of using specially wound potentiometers.

While certain representative embodiments and details have been shown for the purpose of illustrating the invention, it will be apparent to those skilled in this art that various changes and modifications may be made therein without departing from the spirit or scope of the invention.

I claim:

1. The combination in an electric analog computer for obtaining a voltage output proportional to the product of two variable input voltages, the combination comprising a pair of mechanically ganged potentiometers, the first of said potentiometers having a fixed voltage connected across the ends thereof, the second of said potentiometers having one of said variable input voltages connected across the ends thereof, a summing apparatus for measuring the difference between the second of said variable input voltages and the voltage at the wiper contact of said first potentiometer, means for amplifying the voltage difference, servo means operated by the amplifying means for repositioning the potentiometer wipers in a direction to reduce the voltage difference to zero, an output impedance load between the wiper arm and one end of the said second potentiometer, and a compensating impedance between the wiper arm and one end of said first potentiometer, the resistance of said first potentiometer divided by the resistance of the compensating impedance being substantially equal to the resistance of said second potentiometer divided by the resistance of the output impedance.

2. The combination in an electric analog computer to obtain an output voltage proportional to the quotient of input voltages of a pair of mechanically ganged potentiometers, a variable voltage source applied across the ends of one potentiometer, a high gain D. C. amplifier, a first resistance connecting the wiper of said one potentiometer to the input of the amplifier, a second resistance, a second variable input voltage connected through said second resistance to the input of the amplifier, a servo means operated by the output of the amplifier for moving the wipers of the potentiometers, a fixed voltage across the ends of the second potentiometer, and an output impedance connecting the wiper and one end of said second potentiometer, the resistance of the said one potentiometer divided by the said first resistance being substantially equal to the resistance of the said second potentiometer divided by the resistance of the impedance.

3. The combination in an electric analog computer of a pair of mechanically ganged potentiometers, a voltage source applied across the ends of one potentiometer, a high gain D. C. amplifier, a first resistance connecting the wiper of said one potentiometer to the input of the amplifier, a second resistance, a second input voltage connected through said second resistance to the input of the amplifier, a servo means operated by the output of the amplifier for moving the wipers of the potentiometers, a fixed voltage across the ends of the second potentiometer, and an output impedance connecting the wiper and one end of said second potentiometer.

4. A computing element characterized by a minimum of error and comprising a pair of mechanically ganged potentiometers, an output impedance load across the output of one potentiometer, and a resistor having a compensating impedance proportional to the load impedance shunted across the output of the other potentiometer, the proportionality factor for the compensating impedance being substantially equal to the ratio of the end-to-end impedance of the load potentiometer divided by the end-to-end impedance of the associated potentiometer.

5. A multiple potentiometer circuit comprising a plurality of potentiometers having their wiper contacts ganged for movement together, one of said potentiometers being connected across a constant voltage source, a second of said potentiometers being connected across an input signal voltage, a second input signal voltage being provided across the wiper contact and one end of said one potentiometer, an instrument shunted across one leg of one of said potentiometers, said instrument having a resistance tending to load the potentiometer, and a resistor equal in value to the resistance of said instrument and shunted across one leg of the other potentiometer to compensate for loading and to provide linearity.

6. A multiple potentiometer circuit comprising a plurality of potentiometers having their wiper contacts ganged for movement together, one of said potentiometers being connected across a constant voltage source, a second of said potentiometers being connected across an input signal voltage, a second input signal voltage being provided across the wiper contact and one end of said one potentiometer, an instrument shunted across one leg of the potentiometer connected across the constant voltage source, said instrument having a resistance tending to load the potentiometer, and a resistor equal in value to the resistance of said instrument and shunted across one leg of the potentiometer connected across an input signal voltage to compensate for loading and to provide linearity.

7. A multiple potentiometer circuit comprising a plurality of potentiometers having their wiper contacts ganged for movement together, one of said potentiometers being connected across a constant voltage source, a second of said potentiometers being connected across an input signal voltage, a second input signal voltage being provided across the wiper contact and one end of said one potentiometer, an instrument shunted across one leg of the potentiometer connected across an input signal voltage, said instrument having a resistance tending to load the potentiometer, and a resistor equal in value to the resistance of said instrument and shunted across one leg of the potentiometer connected across the constant voltage to compensate for loading and to provide linearity.

References Cited in the file of this patent

UNITED STATES PATENTS

| | | |
|---|---|---|
| 2,434,274 | Lakatos | Jan. 13, 1948 |
| 2,443,624 | Lovell | June 22, 1948 |
| 2,469,627 | Bowman | May 10, 1949 |
| 2,519,262 | Lovell | Aug. 15, 1950 |
| 2,525,038 | Kutzler | Oct. 10, 1950 |

OTHER REFERENCES

Electronic Instruments, volume 21, Radiation Laboratory Series; published by McGraw-Hill Company, Inc., New York, 1948; page 134; Figures 6–4.

Mynall: Electrical Analogue Computing—"Electronic Engineering," July 1947, pages 214–217.

Shannon: Electronic Computer—"Electronics," August 1946, pages 110–113.